(12) United States Patent
Anderson et al.

(10) Patent No.: US 9,780,999 B2
(45) Date of Patent: Oct. 3, 2017

(54) SYSTEMS AND METHODS FOR CONFIGURING DEVICES IN A NETWORK SUPPORTING VLANS

(71) Applicant: GM GLOBAL TECHNOLOGY OPERATIONS LLC, Detroit, MI (US)

(72) Inventors: Anthony Anderson, Macomb, MI (US); Markus Jochim, Troy, MI (US); Jeffrey J. Hoorn, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 14/814,899

(22) Filed: Jul. 31, 2015

(65) Prior Publication Data

US 2017/0033986 A1     Feb. 2, 2017

(51) Int. Cl.
*H04L 12/24*     (2006.01)
*H04L 12/26*     (2006.01)
*H04L 29/08*     (2006.01)
*H04L 12/40*     (2006.01)
*H04L 12/46*     (2006.01)

(52) U.S. Cl.
CPC .......... *H04L 41/0806* (2013.01); *H04L 12/40* (2013.01); *H04L 12/4625* (2013.01); *H04L 12/4641* (2013.01); *H04L 67/12* (2013.01); *H04L 2012/40273* (2013.01)

(58) Field of Classification Search
CPC combination set(s) only.
See application file for complete search history.

(56) References Cited

U.S. PATENT DOCUMENTS

2009/0158360 A1*  6/2009  Diab ................ H04L 12/40
                                                725/75
2015/0207793 A1*  7/2015  Mohamed ......... H04L 63/166
                                                726/6

* cited by examiner

*Primary Examiner* — Yee Lam
(74) *Attorney, Agent, or Firm* — Lorenz & Kopf, LLP

(57) ABSTRACT

Systems and processes are provided for configuring sensory devices within a vehicle. In general, a system includes a computer readable storage medium that stores at least one configuration instruction. The system further includes a microprocessor configured to generate a message based on the at least one configuration instruction. The system further includes a routing device configured to communicate the message to a sensory device of the vehicle according to a virtual identifier associated with a local area network routing configuration.

16 Claims, 2 Drawing Sheets

SYSTEMS AND METHODS FOR CONFIGURING DEVICES IN A NETWORK SUPPORTING VLANS

FIELD

The present disclosure generally relates to the field of vehicles and, more specifically, to methods and systems for configuration of devices of the vehicle.

BACKGROUND

Certain vehicles today may incorporate one or more sensory devices. During installation, the sensory devices are configured to identify where, within the vehicle, they will be located (e.g., right front, right left, etc.).

For example, a conventional sensory device includes input pins in which voltages are applied. A microprocessor of the sensory device interprets the voltage signals from the input pins to determine where the sensory device is located, and configures the sensory device based on this location. In particular, the pattern created by the different voltage pins (e.g., low/low/low, low/high/low, high/low/low, etc.) is used to identify the location of the sensory device. Thus, the number of input pins implemented for each sensory device depends on the number of sensory devices being installed to the vehicle. Implementing multiple pins on a sensory device can be costly and can consume space within the vehicle.

Accordingly, it is desirable to provide improved methods and systems for configuring devices within a vehicle. Furthermore, other desirable features and characteristics of the present invention will be apparent from the subsequent detailed description and the appended claims, taken in conjunction with the accompanying drawings and the foregoing technical field and background.

BRIEF SUMMARY

Systems and processes are provided for configuring sensory devices within a vehicle. In one embodiment, a system includes a computer readable storage medium that stores at least one configuration instruction. The system further includes a microprocessor configured to generate a message based on the at least one configuration instruction. The system further includes a routing device configured to communicate the message to a sensory device of the vehicle according to a virtual identifier associated with a local area network routing configuration.

In another embodiment, a system includes a port of a sensory device configured to receive a message communicated from a vehicle local area network. The system further includes a microprocessor of the sensory device configured to process the message to determine a configuration instruction, and to configure the sensory device based on the configuration instruction.

BRIEF DESCRIPTION OF THE DRAWINGS

The present invention will hereinafter be described in conjunction with the following drawing figures, wherein like numerals denote like elements.

DETAILED DESCRIPTION

Figure 1:
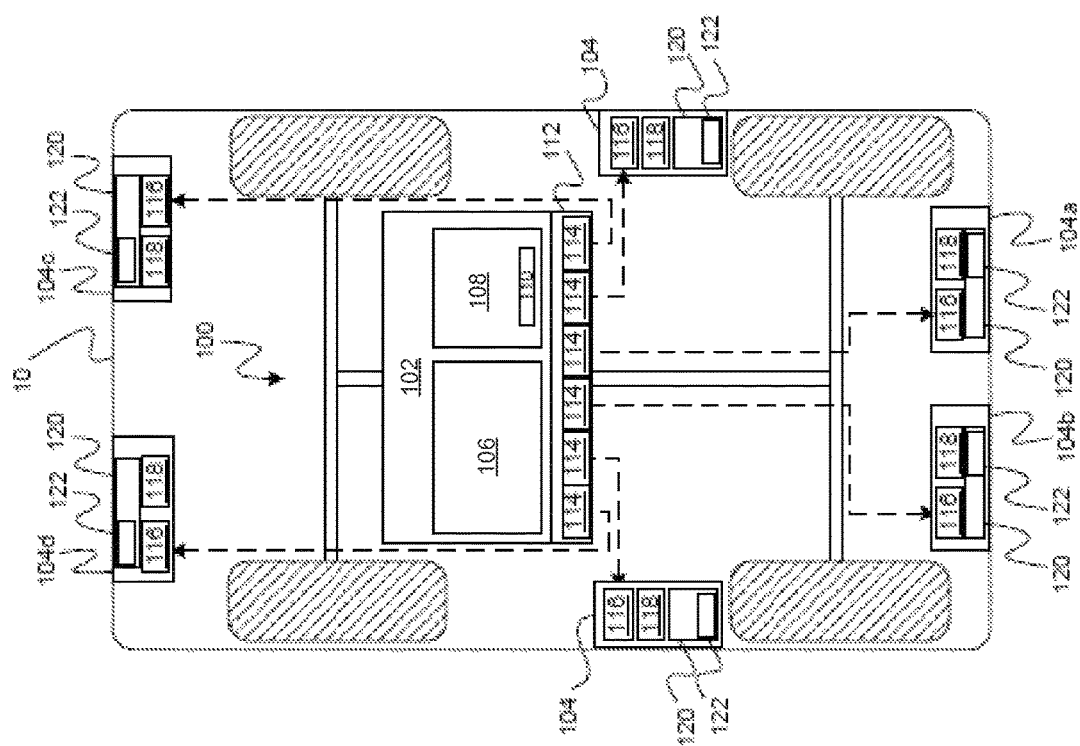
FIG. 1 is a simplified functional diagram of a vehicle having a device configuration system in accordance with various embodiments.

The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

With reference to FIG. 1, a vehicle 10 having a device configuration system 100 is shown in accordance with various embodiments. The device configuration system 100 generally includes at least one configuration master device 102 that is communicatively coupled to one or more sensory devices 104. The sensory devices 104 are located at various locations about the vehicle 10. For example, a first sensory device 104a may be at the right rear (RR) of the vehicle 10; a second sensory device 104b may be located at the left rear of the vehicle 10; a third sensory device 104c may be located at the right front of the vehicle 10; a fourth sensory device 104d may be located at the left front of the vehicle 10; and so forth. As can be appreciated, the sensory devices 104 can be located anywhere within or about the vehicle 10 and are not limited to the present example.

The sensory devices 104 are generally the same sensory device having the same or similar hardware that performs the same or similar functions. The differences in the sensory devices pertain to the conditions or locations that they each sense. That is, each sensory device 104 senses a particular condition or location based on its location within the vehicle 10. The sensory devices 104 sense the particular condition or location based on their configuration. As can be appreciated, the sensory devices 104 may be any device that senses an observable condition associated with the vehicle 10.

In various embodiments, the configuration master device 102 includes at least one microprocessor 106 that is coupled to a computer-readable storage medium 108. The computer-readable storage medium 108 stores software instructions 110 for providing configuration instructions to one or more of the sensory devices 104. A configuration instruction is an instruction for particular sensory device 104 indicating the location of the sensory device 104. The microprocessor 106 executes the instructions 110 stored within the computer-readable storage medium 108 in order to configure the sensory devices 104.

The configuration master device 102 further includes a routing device 112 such as a router, a switch, a bridge, or the like that includes a plurality of ports 114. Each port 114 is capable of transmitting and receiving data according to a protocol of a vehicle local area network, such as, for example, an Ethernet network, or other network. In the depicted example, the routing device 112 includes six ports 114. Each port 114 is communicatively coupled (e.g., via a cable or other connection) to a sensory device 104. The configuration master device 102 communicates configuration messages to the sensory devices 104 through the ports 114 of the routing device 112.

The configuration master device 102 multicasts or broadcasts the configuration message and an associated VLAN ID (virtual LAN ID) to the routing device 112. The routing device 112 is configured such that an incoming configuration message will be forwarded only on the ports of the routing device that belong to the VLAN that is identified by the VLAN ID sent with the configuration message. Consequently the configuration message is forwarded only to the particular sensing device that is connected to this port.

In various embodiments, each sensory device includes a port 116. The port 116 is communicatively coupled (e.g., via a cable or other connection) to a port 114 of the configuration master device 112. The port 116 is capable of transmitting and receiving data according to a protocol of a vehicle local area network, such as, for example, an Ethernet network, or other network. The sensory device 104 receives the configuration messages via the port 116.

The sensory device 104 further includes at least one microprocessor 118 that is coupled to a computer-readable storage medium 120. The computer-readable storage medium 120 stores software instructions 122 for processing the configuration messages received from the configuration master device 102. The microprocessor 118 executes the instructions 122 stored within the computer-readable storage medium 120 in order to process the received messages and to configure the sensory device 104.

Figure 2:
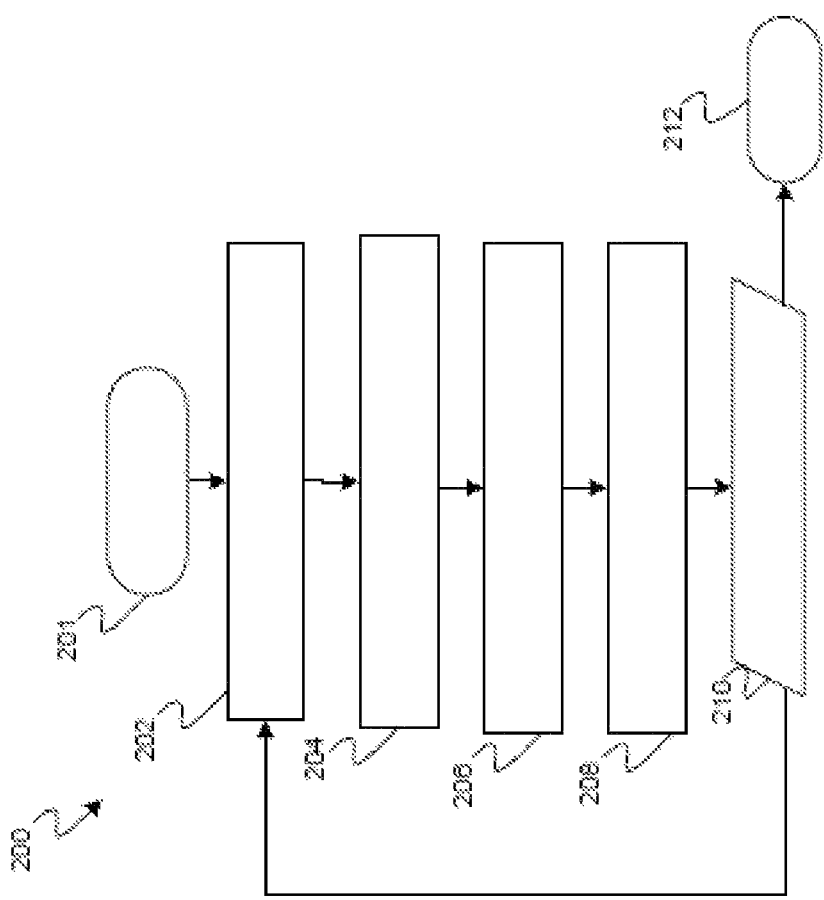

With reference now to FIG. 2, a process 200 for configuring the sensory devices 104 as executed by the configuration master device 102 is shown in accordance with various embodiments. In general, the configuration master device 102 selects configuration instructions for transmittal to particular sensory devices 104 and transmits the configuration instructions as configuration messages sent via the ports 114.

Accordingly, in one embodiment, the method begins at 201. The microprocessor 106 of the configuration master device 102 selects a first configuration instruction as it processes the software instructions 110 stored in the tangible non-transitory computer-readable medium 108 described above at 202. The first configuration instruction indicates a first location within the vehicle 10 of a first sensory device 104. The microprocessor 106 of the configuration master device 102 then selects a VLAN ID associated with the sensory device 104 by way of which the configuration instruction will be transmitted to the sensory device 104 at 204. The microprocessor 106 of the configuration master device 102 generates a message to be communicated that includes the first configuration instruction based on the protocol of the network associated with the VLAN Id at 206. The microprocessor 106 of the configuration master device 102 transmits the message that includes the configuration instruction according to a protocol of the network associated with the VLAN Id at 208. In this way, the configuration instruction is sent to a multicast or broadcast address, but is only presented to a single sensory device 104, via its dedicated port 114. The process then loops back to step 202 where a next configuration instruction is selected for a next sensory device 104. The process 200 continues for each of the sensory devices 104 at 210. Thereafter, the process 200 may end at 212.

Figure 3:
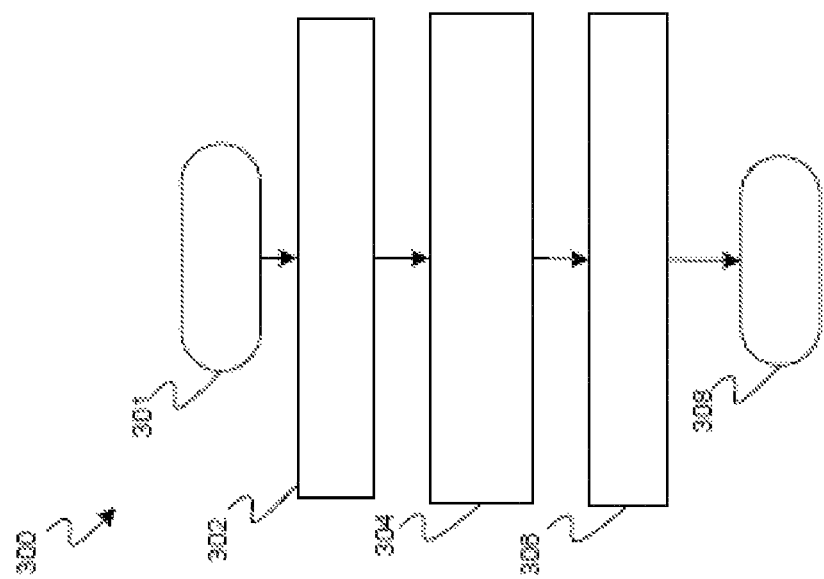
FIGS. 2 and 3 are flowcharts showing an example process for configuring a plurality of sensory devices within a vehicle.

With reference now to FIG. 3, a process 300 for configuring a sensory device 104 as executed by a sensory device 104 is shown in accordance with various embodiments. As can be appreciated, the process 300 can be executed by each of the sensory devices 104. In general, the sensory devices 104 receive the configuration instructions and execute instructions based thereon to configure their location within the vehicle 10.

Accordingly, in one embodiment, the method begins at 301. The sensory device 104 receives the configuration instruction from the configuration master device 102 by way of the configuration message received at the port 116 at 302. The message is received at the port 116 based on the protocol of the network associated with the VLAN Id 116. As the sensory device 104 receives the configuration instruction, the microprocessor 118 for the sensory device 104 processes the configuration instruction, based upon the software instructions 122 stored in its tangible non-transitory, computer-readable storage medium 120, to determine a location within the vehicle 10 at 304. The microprocessor 118 for the sensory device 104 configures the sensory device 104 based upon the software instructions 122 stored in its tangible non-transitory, computer-readable storage medium 120, and further based on the determined location at 306. In this way, the sensory device 104 is configured via a message received by the port associated to the VLAN Id corresponding to the specific location in the vehicle 116. Thereafter, the process 300 may end at 308.

By way of the exemplary systems and processes disclosed herein, a need for dedicated input pins is excluded, thus, reducing the volume, space, weight, and manufacturing requirements that accompany devices that have location identification pins.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A device configuration system for configuring sensors that sense observable conditions of a vehicle, the system comprising:
   a computer readable storage medium that stores at least one configuration instruction, the at least one configuration instruction includes a location of the vehicle and an associated virtual identifier of a virtual area routing configuration;
   a microprocessor configured to broadcast a message based on the at least one configuration instruction; and
   a routing device configured to directly communicate the broadcasted message to at least one of the sensors of the vehicle according to the local area network routing configuration associated with the virtual identifier to configure the sensor.

2. The system of claim 1, wherein the routing device comprises at least one port that is communicatively coupled to the sensor.

3. The system of claim 2, wherein the microprocessor is further configured to generate the message based on the at least one port.

4. The system of claim 1, further comprising the sensory device, wherein the sensor receives the message via a port that is communicatively coupled to the routing device.

5. The system of claim 4, wherein the sensor further comprises a microprocessor configured to process the message to determine the configuration instruction.

6. The system of claim 5, wherein the microprocessor of the sensor is further configured to determine a location within the vehicle from the configuration instruction.

7. The system of claim 6, wherein the microprocessor of the sensor is further configured to configure the sensor based on the location.

8. The system of claim 1, wherein the virtual identifier is associated with a local area network associated with a port of the routing device.

9. The system of claim 8, wherein a vehicle local area network protocol of the local area network is an Ethernet network protocol.

10. The system of claim 1, wherein the computer readable storage medium stores a plurality of configuration instructions, wherein the microprocessor is configured to broadcast a plurality of messages based on the plurality of configuration instructions, and wherein the routing device is configured to communicate each of the broadcasted messages to one of a plurality of sensors of the vehicle according to virtual identifiers associated with the local area network routing configuration.

11. The system of claim 10, wherein the routing device comprises a plurality of ports, each port communicatively coupled to one of the plurality of sensors, and wherein the routing device is configured to communicate the messages to the plurality of the sensors via the plurality of ports.

12. A device configuration system for configuring a sensor that senses observable conditions associated with a vehicle, the system comprising:
a port of the sensor configured to receive a message communicated from a vehicle local area network based on a virtual identifier associated with the vehicle local area network; and
a microprocessor of the sensor configured to process the message to determine a configuration instruction, and to configure a location of the sensor within the vehicle based on the configuration instruction.

13. The system of claim 12, wherein the vehicle local area network is an Ethernet network.

14. The system of claim 12, wherein the port is associated with the vehicle local area network that is associated with the virtual identifier.

15. A process for configuring a plurality of sensors that sense observable conditions of a vehicle, the process comprising:
selecting, by a microprocessor, a first configuration instruction that includes a location of the vehicle;
selecting, by the microprocessor, a first virtual identifier based on a local area network routing configuration;
broadcasting a communication message based on the first configuration instruction and the first virtual identifier;
transmitting, by a router, the communication message to a first sensor via a first port.

16. The process of claim 15, wherein the first sensor receives the communication message via port of the first sensor communicatively coupled to the first port.

* * * * *